May 18, 1954  E. L. POND  2,678,499
MEASURING DEVICE
Filed Nov. 23, 1951
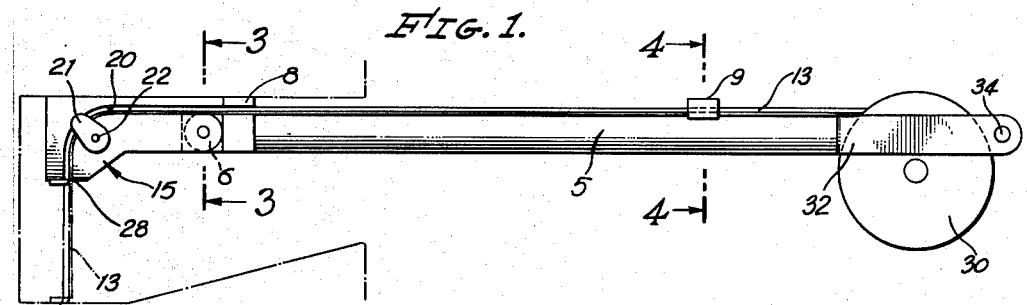
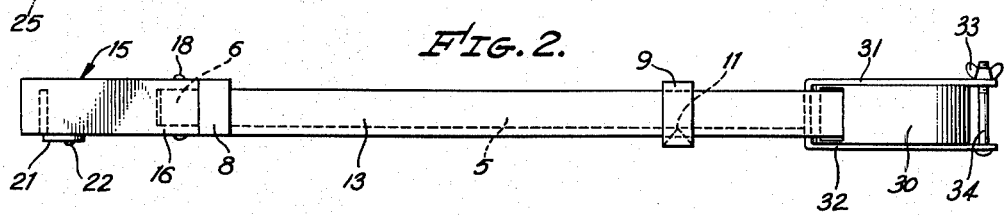
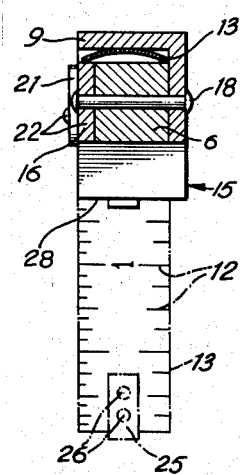
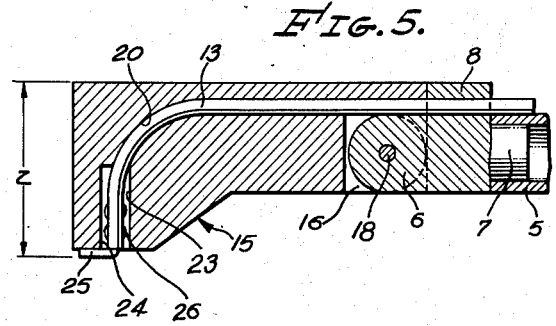
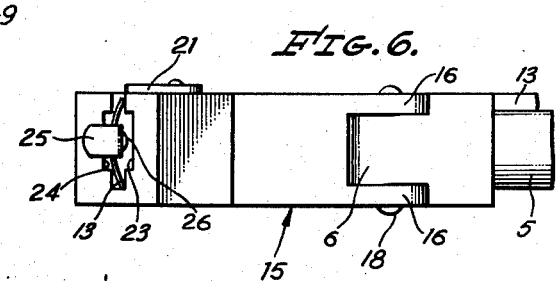
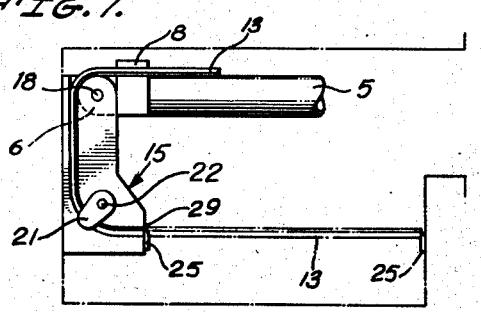
EVELYNE L. POND,
INVENTOR.
BY
ATTORNEY Patented May 18, 1954

2,678,499

UNITED STATES PATENT OFFICE 2,678,499

MEASURING DEVICE

Evelyne L. Pond, North Hollywood, Calif.

Application November 23, 1951, Serial No. 257,905

4 Claims. (Cl. 33—138)

This invention relates to measuring devices, and particularly to a device for measuring internal distances or dimensions inaccessible to the normal measuring device.

Devices which provide right-angled measurements are well-known, such as those shown in U. S. Patents No. 745,357 of December 1, 1903; No. 2,347,273 of April 25, 1944; and No. 2,480,725 of August 30, 1949. These prior devices utilize tapes which slide longitudinally in a groove and are directed at right angles by a head member. The present invention is directed to such a general device, but one which will permit the insertion of any standard tape, such as the well-known steel tape, and which will permit measurements to be made within cavities not normally accessible to a normal tape. The measurements may be made at ninety degrees to the usual position of the tape, or at one-hundred eighty degrees thereto, and all intermediate angles. The device is particularly simple in construction and may be formed from metal, wood, or a molded plastic, the tape being quickly insertable in the device and removable therefrom when desired.

The principal object of the invention, therefore, is to facilitate making internal measurements in spaces not normally accessible.

Another object of the invention is to provide an improved measuring device.

A further object of the invention is to provide a device for use with a measuring tape and which will direct the tape in various directions for taking measurements in normally inaccessible spaces.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view of a measuring device embodying the invention.

Fig. 2 is a top view of the measuring device shown in Fig. 1.

Fig. 3 is a cross-sectional view of the pivot point of the invention, and taken along the line 3—3 of Fig. 1.

Fig. 4 is a cross-sectional view of the invention taken along the line 4—4 of Fig. 1.

Fig. 5 is a cross-sectional view of the head of the measuring device.

Fig. 6 is an enlarged view showing the tape exit end of the head of the invention, and Fig. 7 is a partial view showing another adjustment of the invention.

Referring now to the drawings, in which the same numerals identify like elements, a handle 5, which may be a solid or hollow plastic rod, terminates in a cylindrical knuckle 6 having a hole therethrough. In the event the handle 5 is hollow, a short solid rod 7 may be inserted therein, on which the knuckle 6 is formed. A guide member 8 is formed on the handle near the knuckle 6, while a second guide member 9 is formed near the other end of the handle 5. This member 9 has a pointed tip 11 to facilitate the reading of the indicia 12 on a tape 13.

A head member 15 has a yoke 16 between the legs of which the knuckle 6 is positioned, and which are attached together by a pin, screw, or rivet 18. The ends of the legs of the yoke 16 are curved so that the head may pivot ninety degrees on the pivot 18. (See Figs. 1 and 7.) In the head 15, is a curvilinear groove 20, in which the tape 13 is laterally inserted. The tape is held in the groove by a latch 21 rotatable on pivot 22. The head 15 may be of wood, metal, or of molded plastic. On each side of the groove at the exit end of the head, are recesses 23 and 24, which accommodate the portion of stop member 25 at the end of the tape which is in contact with the tape, and also, the screws 26, which hold the stop member 25 on the tape. Since the normally curved tape 13 flattens out when in curved position in the head 15, the depth of the groove corresponds to the width of the tape when flat.

The tape 13 is contained in the usual reel casing 30, and is held in position on the handle 5 by being clamped between members 31 and 32 attached to handle 5. A wing nut 33 on a bolt 34 tightens the members 31 and 32 against the casing 30.

As shown in Fig. 5, the distance z is one inch, this distance including the thickness of the head 15 plus the thickness of the stop 25. By providing the head with this dimension, the actual measurement is then one inch plus the reading shown on the tape at 28. In other words, the distance being measured in Fig. 1 will be equal to the reading at 28 plus one inch. This is also true of the distance being measured in Fig. 7, wherein the distance is actually the reading at 29 plus one inch. However, it is difficult to remove the device from the space shown in Fig. 7 without withdrawing the tape into the head 15. Therefore, to make this measurement, the reading will be made at the guide and indicia member 11. To make this measurement, the device is placed in the position shown in Fig. 7 with the end of the tape withdrawn to the head 15. A reading is then made at 11. The tape is then moved longitudinally to its position shown in Fig. 7, and another reading is made at 11. The correct measurement of the distance being measured in Fig. 7 is, therefore, the difference between the readings made at 11 plus one inch.

Although the handle 5 is shown of a certain length with respect to head 15, this handle may be of any length by having hinged or telescoping sections. Longer handles will permit measurements to be made in high places without ladders, while the device may be folded or telescoped into a small length for convenient handling.

I claim:

1. An adjustable measuring device comprising a head member having a curvilinear groove therein for accommodating a measuring tape, means for holding said tape against lateral movement thereof in said groove, a handle for said head, a knuckle joint connecting said head and handle for rotating said head substantially ninety degrees with respect to the axis of said handle, means for holding a portion of said tape parallel with the axis of said handle, a stop at the end of said tape and recesses at the tape exit end of said groove to accommodate said stop, the axis of said tape at said exit being at right angles to the axis of said handle in one position of said head, and the axis of said tape at said exit being parallel with the axis of said handle in another position of said head.

2. An adjustable measuring device in accordance with claim 1, in which the width of said head perpendicular to the axis of said handle when in said first mentioned position is one inch minus the thickness of said stop.

3. A device for internal measurements, comprising a handle, a knuckle at the end of said handle, a triangularly shaped head having a yoke pivoted on said knuckle, said head having a narrow curvilinear groove therein, said groove having exits from said head at right angles to one another and adapted to have a flexible tape inserted transversely therein, a latch on said head for holding said tape in a fixed transverse position in said groove, said tape being movable longitudinally therein, and guide and indicia means for said tape, said head being pivotable on said knuckle to positions ninety degrees apart to change the direction of movement of said tape from 90 degrees to 180 degrees.

4. A device in accordance with claim 3, in which a reel is provided for said tape, together with a casing for said reel and a clamping bracket is provided on said handle for holding said casing in a fixed position at the end of said handle.

References Cited in the file of this patent

UNITED STATES PATENTS

| Number | Name | Date |
|---|---|---|
| 667,516 | Gibboney | Feb. 5, 1901 |
| 745,357 | Lanham | Dec. 1, 1903 |
| 2,347,273 | Lyle | Apr. 25, 1944 |
| 2,480,725 | Gilbert | Aug. 30, 1949 |